Sept. 5, 1944.  F. W. SIDE  2,357,433
MEASURING INSTRUMENT
Filed June 20, 1942
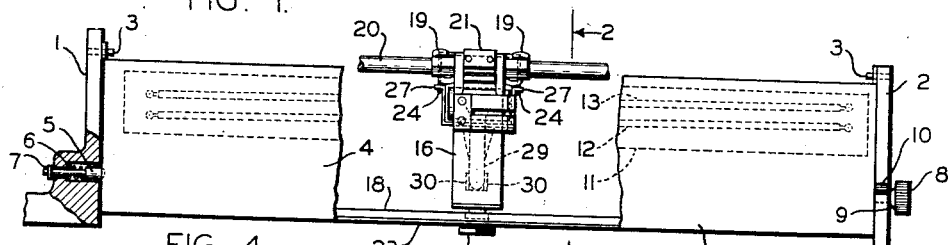
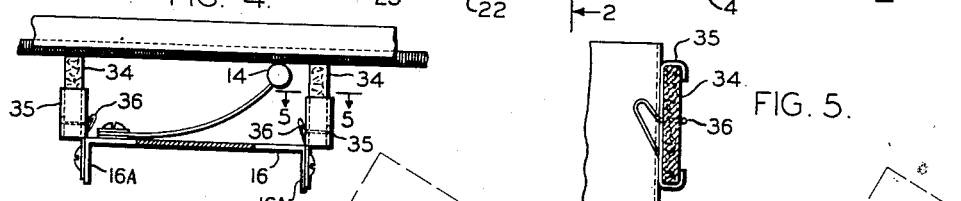
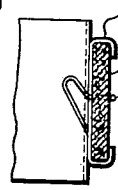
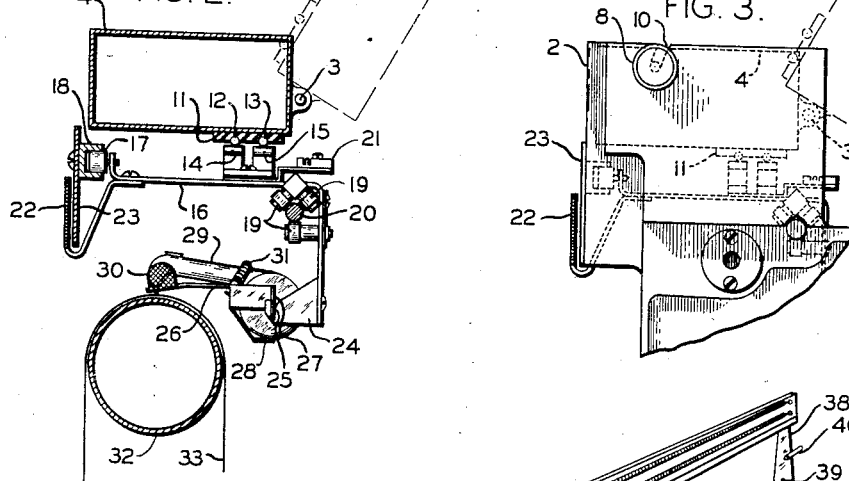
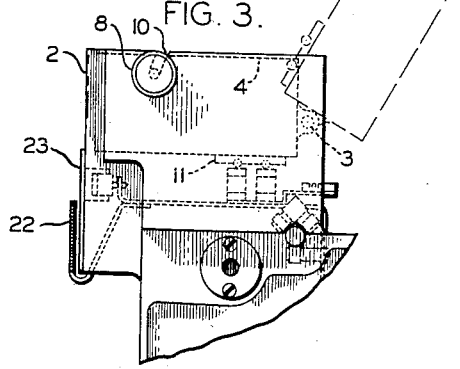
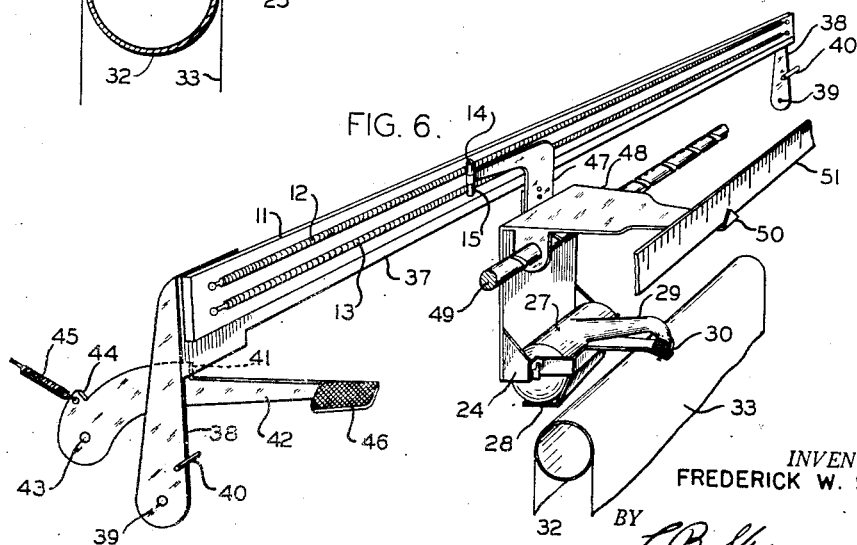
INVENTOR.
FREDERICK W. SIDE
BY
C. B. Spangenberg
ATTORNEY.

Patented Sept. 5, 1944

2,357,433

UNITED STATES PATENT OFFICE 2,357,433

MEASURING INSTRUMENT

Frederick W. Side, Philadelphia, Pa., assignor to The Brown Instrument Company, Philadelphia, Pa., a corporation of Pennsylvania Application June 20, 1942, Serial No. 447,865

15 Claims. (Cl. 201—62)

The present invention relates to measuring instruments and more particularly to that type of instrument in which a slide-wire is used.

In instruments of the potentiometer type a known potential is impressed across a resistance known as a slide wire. An unknown potential is then impressed across a portion of this slide-wire in opposition to the known potential by means of a contact that is moved along the slide-wire to a point at which the known and unknown potentials are equal. The position of the contact is then proportional to the value of the latter and may be accurately measured. In order to get an accurate measurement, however, it is necessary that the slide-wire be kept clean.

In most potentiometer instruments the slide-wire is mounted rigidly in place and in a more or less inaccessible position. This means that the slide-wire is hard to get to for cleaning purposes. As a result, the slide-wire is not cleaned as often as it should be and the readings of the potentiometer are liable to become inaccurate and erratic.

It is an object of my invention to provide a mounting for a slide-wire in a measuring instrument in which the slide-wire is mounted in a protected position. The mounting of my invention is also adapted to be moved to a position in which the slide-wire is readily accessible for cleaning from the front of the instrument in which it is located.

It is a further object of the invention to provide a mounting for a potentiometer slide-wire in which the slide-wire may be moved from its operative position to a position in which it may be cleaned. This mounting is so designed that the slide-wire will always be returned to exactly the same position in which it was originally located.

It is a further object of my invention to provide a slide-wire wiper that may be attached to the carrier which moves the slide-wire contact. This wiper is used to clean the slide-wire of accumulated dust or dirt as the contact is moved relative thereto. The use of this wiper reduces the frequency with which the slide-wire must be given a thorough cleaning manually.

The various features of novelty which characterize this invention are pointed out with particularity in the claims annexed to and forming part of this specification. For a better understanding of the invention, however, its advantages and specific objects obtained with its use, reference should be had to the accompanying drawing and descriptive matter in which is illustrated and described a preferred embodiment of the invention.

In the drawing:

Figure 1 is a top view partly in section disclosing the slide wire support.

Figure 2 is a view taken on line 2—2 of Figure 1.

Figure 3 is a view taken from the right of Figure 1.

Figure 4 is a view of a modified form of the invention showing the use of wipers.

Figure 5 is a view taken on line 5—5 of Figure 4, and

Figure 6 is a perspective view of a modified form of the invention.

In potentiometer instruments or other measuring instruments which may employ a slide wire, there is usually provided a swinging frame (not shown) which has a pair of side plates on it that are indicated in Figure 1 at 1 and 2. Pivoted to move around points 3 on each of the side plates is a box-like structure or casing 4 in which may be mounted resistances or other parts which are necessary in a measuring instrument. This structure is held in its position of Figures 2 and 3 by locking means acting on its ends. The means on its left end is shown as a plunger 5 that is slidably mounted in the left side plate 1 and which engages with an indentation on the left end of the casing 4. The plunger is forced to the right into engagement with the casing by means of a spring 6 and has its movement limited by a washer 7 that is attached to the small end of the plunger. The locking means on the right end consists of a threaded screw 8 that is received by the right end of the casing and which moves therewith. In the operative position of the casing the screw 8 lies within a slot 10 formed in the side plate 2. The screw 8 is provided with a conical surface 9 formed between its head and shank, which, when the screw is tightened up, bears against the outer edge of the side plate 2 to draw casing tightly against the inside face of the side plate. The conical surface 9 tends to center the screw with respect to the slot so that the casing 4 will always be in exactly the same position with respect to the side plate each time it is returned to this position.

Attached to the lower surface of the casing 4 is an insulating block 11 that is used to support a slide wire 12 and a parallel collector bar 13. The slide wire and collector bar are engaged respectively by contacts 14 and 15 that are mounted upon and insulated from a pen carriage 16, which is adapted to be moved transversely of the instrument between the side plates 1 and 2. To this end, the pen carriage is provided on its front end with a roller 17 that is received in a channel member 18, the ends of which are attached to the side plates. The rear end of the pen carriage is provided with three rollers 19 that engage a shaft 20 which also extends between the side plates. The pen carriage is moved back and forth along the channel 18 and the shaft 20 by means of a cable (not shown) which is fastened to a cable clamp 21 extending upwardly and rearwardly from the top of the pen carriage. The cable may be driven in any suitable manner, as is well known in the art. The pen carriage is also provided with a pointer 22 which extends downwardly from the same, and up in front of a scale 23 that is attached to the channel 18. In this fashion the position of the pen carriage may be indicated on a calibrated scale.

The lower portion of the pen carriage is provided with means to receive a pen holder. To this end wing members 24 extend forwardly from the lower portion of the pen carriage. Each member 24 has formed in it a notch 25 that is adapted to receive outwardly extending parts 27 of a pen holder 26. The pen holder is provided with a member 28 upon which the barrel of the pen 29 rests, and has a forwardly projecting part provided with an opening through which the writing tip of the pen projects. On each side of the opening through which the writing tip projects are wings 30 which, with the opening, serve the purpose of positively locating the writing tip of the pen with respect to the pen carriage and also provide a means whereby the pen holder may be grasped when it is desired to remove the pen from the pen carriage. The pen is normally retained in the pen carriage by means of a spring 31 which is attached to the holder and extends across the neck of the pen.

In the operation of an instrument of this type, the pen carriage is moved back and forth between the side plates of the instrument in response to potentiometer unbalance to a position in which the potentiometer is balanced. As this movement occurs, the pen draws a record of the value of the condition upon a chart 33 that passes over a chart drum 32. The position of balance is recognized in the instrument when the contacts 14 and 15 have moved to the proper position along the slide wire 12 and the collector 13, but if for some reason the slide wire and the collector become dirty it is difficult to get a proper electrical connection between them, and therefore erratic or incorrect readings may result. To this end I have mounted the slide wire in my instrument in such a fashion that it is protected against dust which might harmfully settle upon it. This is accomplished by having the slide wire facing downwardly and being engaged by contacts that are spring pressed upwardly. In any event, the slide wire will eventually need cleaning with a frequency that depends upon the amount of dust and dirt that are encountered in the location of the instrument. When such a cleaning is needed, the screw 8 can be loosened and the casing 4, upon which the slide wire is mounted, moved to the dotted line position of Figures 2 and 3. At this time, the slide wire and the collector bar are in a position to be inspected from above, and are accessible for cleaning. Mounting the slide wire so that it may be tilted from a protected to an accessible position greatly facilitates the cleaning operation which is necessary in instruments of this type. By means of the plunger 5 and the screw 8 it is insured that the slide wire will always be returned to exactly the same position in which it was located prior to the cleaning operation.

In some cases, the instrument may be placed in a particularly dusty or dirty location. This means that the slide wire must be cleaned quite often in order to keep the instrument operating properly. When such is the case it is desirable to reduce the number of cleanings necessary by having means to wipe or clean the slide wire as the pen carriage moves back and forth between the side plates of the instrument. A wiper for this purpose is shown in Figures 4 and 5, and may readily be attached to the pen carriage which has previously been described. To this end, the wiper consists of a piece of leather or other suitable material which is slidably held in a holder 35 that is attached to a turned down portion 16A of the pen carriage. The wiper is spring pressed upwardly into engagement with the slide wire by means of a small spring 36. It is best to provide two wipers, one on each side of the pen carriage, since if this is done the slide wire will be cleaned ahead of the contact, no matter in which direction the pen carriage is moving.

Another embodiment of the invention is disclosed in Figure 6, in which the insulating member 11 is mounted on a part 37 that extends between a pair of standards 38. Each of these standards is pivoted at 39, and normally is moved in a clockwise direction in Figure 6 into engagement with stops 40 that serve to properly position the slide wire with respect to the contact. The standards 38 are held in their position in engagement with the stops by means of engagement between the back surface of the part 37 and a shoulder 41 that is formed on holding lever 42. This lever is pivoted at 43, and may be moved around its pivot and against the bias of a spring 45 by depressing the thumb portion 46. The lever 42 is provided with a second shoulder 44 to limit the counter-clockwise movement of part 37 after the shoulder 41 has been moved out of engagement therewith. When it is desired to clean the slide wire, the portion 46 is depressed to move shoulder 41 out of engagement with part 37. The slide wire supports may then be tilted in a counter-clockwise direction into engagement with the shoulder 44 where the slide wire will be held in an accessible position. Merely moving the slide wire clockwise, namely, bringing the supports 38 into engagement with the stops 40, will properly locate it in working position. At this time, spring 45 will move the lever 42 counter-clockwise so that shoulder 41 will move into its holding position.

In this embodiment of the invention, contacts 14 and 15 are supported by a member 47 that is attached to the rear surface of a pen carriage 48. In this embodiment also, the pen carriage is shown as being moved transversely of the instrument, but in this case by means of engagement between a suitable pin mounted on the pen carriage, and the thread of a helically threaded shaft 49 in a conventional manner. The shaft is rotated in any suitable manner in accordance with the potentiometer unbalance to move the pen carriage to a position in which the potentiometer circuit is properly balanced. The balanced position, and therefore the location of the pen is indicated by an upturned portion 50 on the front end of the pen carriage, which cooperates with a suitable scale 51. The pen carriage of this embodiment is shown as supporting a pen in a manner identical to that of the embodiment previously described, and may also be provided with wipers of the type shown in Figures 4 and 5.

From the above description, it will be seen that I have provided a measuring instrument in which a slide wire is normally held in a protected position, but may be moved to a position in which it is accessible to be cleaned, and if necessary replaced. I have also provided a wiper to be attached to the pen carriage which may be used when necessary to continuously clean the slide wire as the pen carriage and slide wire contact carried thereby are moved transversely of the instrument.

While in accordance with the provisions of the statutes, I have illustrated and described the best form of this invention now known to me, it will be apparent to those skilled in the art that changes may be made in the form of the apparatus disclosed without departing from the spirit of this invention as set forth in the appended claims, and that in some cases certain features of this invention may be used to advantage without a corresponding use of other features.

Having now described this invention, what I claim as new and desire to secure by Letters Patent is:

1. In a measuring instrument, a slide wire, a contact to engage and move along said slide wire, means to move said contact through a path, movable means adjacent said path to which said slide-wire is attached, said movable means being so arranged that upon movement thereof the slide wire and movable means are moved bodily away from said contact into a position accessible for cleaning of the former.

2. In a potentiometric type measuring instrument, a slide-wire, a contact adapted to engage said slide wire, means to move said contact through a path, a pivoted support movable from a first position to a second position lying adjacent said path, said slidewire being mounted on said support in a position to be engaged by said contact as the latter moves through its path when the support is in its first position.

3. In a measuring instrument, a contact movable through a path, a slide wire located adjacent said path and in a position to be engaged by said contact as the latter moves, a pivoted support upon which said slide wire is mounted, said support being movable from a first position in which the slide wire engages said contact to a second position entirely free of the contact, and means to hold said support releasably and accurately in its first position.

4. In a measuring instrument, a frame having a pair of sides, a contact mounted for movement between said sides, a support extending between said sides and parallel to the path of movement of said contact, means to pivot said support in said sides for movement from a first to a second position, detent means between one of said pair of sides and one end of said support to tend to hold said support in its first position, and a slide wire mounted on said support to be engaged by said contact when said support is in its first position and to be accessible for cleaning and inspection when said support is in its second position.

5. In a measuring instrument, the combination of a cooperating slide wire and contact, means to move said contact through a path from one end to the other of said slide wire, a movable support to which said slide wire is attached whereby the slide wire and support can be moved to move said slidewire into and out of engagement with the contact, means upon which said support is mounted for movement, and cooperating parts between said last mentioned means and support to always bring said slide wire back to the same position relative to said contact after the support has been moved.

6. In a measuring instrument a movable carriage with a contact mounted upon the top of the same, a support above said carriage, a slide wire carried on the bottom of said support in a position to be engaged by said contact as said carriage moves, and means to mount said support for pivoted movement whereby it may be moved to a position in which said slide wire is accessible from above said support.

7. In a measuring instrument, a carriage movable through a path, a contact carried by said carriage, a slide wire engaged by said contact as the latter moves, means to support said slide wire for pivotal movement into and out of engagement with said contact, and means to releasably hold said support in a position in which said slide-wire and contact are in engagement.

8. In a measuring instrument, a carriage movable through a path, a contact extending from the rear of said carriage, a slide wire, a pivoted support for said slide wire mounted to the rear of said carriage so that the slide wire is in engagement with said contact and upon pivoting of the support may be moved out of engagement therewith, means to releasably hold said support in a position in which said slide wire and contact are in engagement, and means biasing said holding means into an operative position.

9. In a measuring instrument, the combination with a slide wire, a contact mounted in a position to engage said slide wire, a movable support for said contact whereby the contact may be moved along said slide wire, and a wiper carried by said support and engaging said slide wire to clean the same as said support is moved.

10. In a measuring instrument, an elongated slide wire, a contact in engagement with said slide wire, a movable carriage upon which said contact is mounted so that said contact may be moved relative to said slide wire, a wiper carried by said carriage and engaging said slide wire to clean the same, and means resiliently forcing said wiper into engagement with said slide wire.

11. In a measuring instrument, an elongated slide wire, a contact to engage said slide wire, a carriage upon which said contact is mounted, means to relatively move said carriage and slide wire, and a wiper for said slide wire carried by said carriage whereby upon relative movement of said carriage and slide wire said wiper will clean the slide wire.

12. In a measuring instrument, a slide wire, a contact, a pivotally mounted support movable from a first position to a second position upon which said slide wire is mounted, a movable carriage upon which said contact is mounted, means to move said carriage through a path adjacent said slide wire, said slide wire and contact being in engagement when said support is in its first position and out of engagement when said support is in its second position, a wiper carried by said carriage to engage said slide wire when the latter is engaged by said contact, and means to resiliently force said wiper into engagement with said slide wire.

13. In a measuring instrument, a slide wire, a contact, a carriage upon which said contact is mounted to engage said slide wire, means to relatively move said slide wire and carriage, and a pair of wipers, one on each side of said contact, carried by said carriage whereby said slide wire will be cleaned before engagement by said contact as they move relative to each other, in either direction.

14. In a measuring instrument, a carriage mounted for movement through a path, a contact mounted upon said carriage for movement therewith, a pair of wipers also mounted upon said carriage, one on each side of said contact in line with the direction of movement of the same, means to move said carriage through said path, a slide wire mounted in a position to be engaged by said contact and wipers as said carriage is moved through its path, and means to resiliently force said contact and wipers into engagement with said slide wire.

15. In a measuring instrument, an elongated resistance element, a contact mounted for movement along and in engagement with substantially the entire length of said resistance element, a first supporting means upon which said contact is mounted and along which it is moved, a second supporting means to which said resistance element is attached, means to mount said two supporting means so that they may be moved relative to each other in a separating direction whereby said contact and resistance element are separated to permit cleaning and inspection of said resistance element, and releasable means to hold normally said supporting means in positions so that said contact engages said resistance element.

FREDERICK W. SIDE.